United States Patent [19]

Skaria et al.

[11] Patent Number: 4,613,493
[45] Date of Patent: Sep. 23, 1986

[54] METHOD OF MANUFACTURE OF CALCINED ALUMINUM FLUORIDE

[75] Inventors: Arankathu Skaria, Stäfa; Reiner Stark, Ebmatingen; Hans Schenkel, Forch, all of Switzerland

[73] Assignee: Swiss Aluminium Ltd., Chippis, Switzerland

[21] Appl. No.: 315,009

[22] Filed: Oct. 26, 1981

[30] Foreign Application Priority Data

Nov. 6, 1980 [CH] Switzerland .................. 8233/80
Nov. 6, 1980 [CH] Switzerland .................. 8234/80

[51] Int. Cl.$^4$ ............................................. C01B 9/08
[52] U.S. Cl. ................................................ 423/489
[58] Field of Search ................................... 423/489

[56] References Cited

U.S. PATENT DOCUMENTS

| | | | |
|---|---|---|---|
| 3,057,681 | 10/1962 | Gernes | 423/489 |
| 3,606,283 | 9/1971 | Weber | 423/489 |
| 3,991,171 | 11/1976 | Haidinger | 423/489 |
| 4,248,849 | 2/1981 | Skaria | 423/489 |

Primary Examiner—John Doll
Assistant Examiner—Jackson Leeds
Attorney, Agent, or Firm—Bachman & LaPointe

[57] ABSTRACT

The invention relates to a method of manufacturing calcined aluminum fluoride, $AlF_3$, from aluminum fluoride hydrate, especially aluminum fluoride trihydrate, $AlF_3.3H_2O$, by drying and calcining. It is characterized in that (1) the hydrate is pre-dried or pre-calcined,
(2) the pre-dried or pre-calcined hydrate is freed of the fine portion and
(3) is totally dehydrated and calcined.

The advantage of the method lies in the prevention of adhesions on the walls of the calcining apparatus, which restrict transmission of heat, which hitherto made continuous operation impossible, and in the increase of the purity of the product produced.

A variation of method lies in the fact the fine component arising from the second method step is prepared into a coarser material, possibly added again to the product of the second method step which is free of fine component, and according to the third step of the method is dehydrated and calcined.

11 Claims, No Drawings

METHOD OF MANUFACTURE OF CALCINED ALUMINUM FLUORIDE

BACKGROUND OF THE INVENTION

The present invention relates to a method of manufacturing calcined aluminum fluoride, $AlF_3$, from aluminum fluoride hydrate, especially from aluminum fluoride trihydrate, $AlF_3 \cdot 3H_2O$, by drying and calcining.

In the crystallization of aluminum fluoride, $AlF_3$, from aqueous solutions, hydrates of the aluminum fluoride are obtained, among others especially aluminum fluoride trihydrate, $AlF_3 \cdot 3H_2O$. The dehydration of the hydrate presents problems, because during the heating to the calcining temperature, usually of 500°–600° C., in contact with the separated steam, a hydrolysis reaction takes place, schematically roughly according to the equation:

$$2AlF_3 + 3H_2O \rightarrow Al_2O_3 + 6HF$$

If aluminum fluoride hydrate is calcined in a single step in a directly heated lined rotary furnace in countercurrent, then the result is a calcined product with an $AlF_3$ content of only 86 up to a maximum of 94%. The remainder is substantially $Al_2O_3$, produced by the hydrolysis reaction referred to above, and $SiO_2$ which, during crystallization of aluminum fluoride hydrate, is precipitated with it.

If aluminum fluoride is used in aluminum fusion electrolysis directly, or for the production of cryolite, $Na_3AlF_6$, for the same purpose, then a content of $SiO_2$ in the aluminum fluoride of around 0.3% by weight is acceptable, but however the lowest possible $SiO_2$ contents are desired, because $SiO_2$ disturbs the progress of the electrolysis and produces a raw aluminum which cannot be employed for all purposes. A higher content of $Al_2O_3$ in aluminum fluoride would, in itself, not have a disturbing effect during the electrolysis, because alumina is used as well. A smallest possible $Al_2O_3$ content in the aluminum fluoride is aimed at on economic grounds. An attempt is made to keep as high as possible the efficiency of use of the fluosilicic acid, $H_2SiF_6$, supplied for the manufacture of aluminum fluoride hydrate, which naturally is not the case with the occurrence of hydrolysis by the separation of hydrogen fluoride.

A number of methods are known which extensively exclude the hydrolysis reaction, so that products are obtained the $AlF_3$ content of which is $\geq 96\%$ by weight, but which however still contain $SiO_2$ in the range of around 0.3% by weight.

The hydrolysis reaction can be extensively prevented by step-wise dehydration of the hydrate: In the 1st step the aluminum fluoride hydrate, generally aluminum fluoride trihydrate, $AlF_3 \cdot 3H_2O$, is dried in the usual way and partly dehydrated; in the 2nd step complete dehydration and calcining occurs.

It is technically simple and very economic to carry out the 2nd step by means of a rotary furnace, especially an indirectly heated rotary furnace according to U.S. Pat. No. 4,248,849. Accordingly, product which, according to U.S. Pat. No. 3,991,171 has been calcined in a disc drier from aluminum fluoride trihydrate, $AlF_3 \cdot 3H_2O$, to aluminum fluoride semihydrate, $AlF_3 \cdot 0.5H_2O$, is calcined in an indirectly heated rotary furnace to anhydrous aluminum fluoride, $AlF_3$.

A hitherto unsolved problem during calcining, especially with employment of an indirectly heated rotary furnace, are the formations of crusts or adhesions of aluminum fluoride on the drum wall. These build up during the calcining and hinder continuous operation. In addition, the heat transfer to the material to be calcined in the rotary furnace is strongly hindered, which greatly reduces in consequence the output of the furnace. It is very difficult to remove the adhesions again from the furnace wall. For this purpose, the furnace must be started and stopped. This is associated with significant losses of production.

A two-fold objective therefore underlay the present invention, firstly to find a continuous method for calcining of aluminum fluoride hydrate, especially aluminum fluoride trihydrate, $AlF_3 \cdot 3H_2O$, which does not have the above-mentioned disadvantages, with the employment of a rotary furnace, especially an indirectly heated rotary furnace, and secondly, to find a method of manufacture of aluminum fluoride, $AlF_3$, which has an $AlF_3$ content of $\geq 96\%$ by weight with a low $SiO_2$ content, preferably of $\leq 0.1\%$ by weight. In addition, the product should also be free of dust, because in charging during the electrolysis not insignificant quantities are eddied into the air by the flow of heat and by the draught in the furnace hall, which makes working at the furnaces more difficult.

SUMMARY OF THE INVENTION

As a solution of the first part of the objective it has been surprisingly found that, in a 2-step method known per se for manufacture of aluminum fluoride by drying or precalcining of the aluminum fluoride hydrate, especially of aluminum fluoride trihydrate, and subsequent calcining of the product which has been treated in this way, by means of a rotary furnace, especially an indirectly heated rotary furnace, the adhesions or formations of crusts can be prevented when the fine portion of the aluminum fluoride hydrate dried or pre-calcined in the 1st step is removed before the total dehydration step. The method according to the invention is thus 3-step and characterized by (1) the starting hydrate is pre-dried or pre-calcined,
(2) the pre-dried or pre-calcined hydrate is freed of the fine portion, and
(3) the pre-dried or pre-calcined hydrate is totally dehydrated and calcined, in particular in an indirectly heated rotary furnace.

As fine dust is here understood dust with particles up to 60μ. The main portion lies in the range $\leq 40\ \mu$, especially in the range $\leq 20\ \mu$. If in the 1st step along with the predrying there occurs also a pre-calcining, then this can be carried out according to the invention in the range of the hydrates $AlF_3 \cdot 3H_2O$ and $AlF_3 \cdot 0.3H_2O$.

Surprisingly it has been found that the separation of the fine portion according to the 2nd step is possible by partial air screening. Adhesion or sticking of the fine dust to the larger particles, as occurs with other kinds of fractionation of the aluminum fluoride hydrate of this method step, is astonishingly prevented by the air screening. It is to be assumed that electrostatic effects produce the good separation.

DETAILED DESCRIPTION

With the method according to the present invention it is possible to calcine aluminum fluoride hydrate in a rotary furnace, especially in an indirectly heated rotary furnace, without the feared adhesions or crusts arising on the furnace wall. Advantageously one proceeds in such a way that the total dehydration of the aluminum fluoride hydrate takes place with a continuously rising temperature gradient within a time span of up to 45 minutes to the calcining temperature of 500°–600° C. The calcined product obtained is free of dust and has an AlF$_3$ content of $\geq 97\%$ by weight, and thus lies rather above the values obtained usually with the conventional 2-step method. It can be used in the charge in aluminum fusion electrolysis without difficulties, because the otherwise usual eddying by heat flow at the furnaces and by draught in the furnace hall is absent.

Analytical investigations have produced the surprising recognition, that the adhesions in the calcining drum contain about 9 times more SiO$_2$ than the aluminum fluoride dehydrated and calcined in the rotary furnace. Likewise the fine dust has about the same high SiO$_2$ content. Evidently the crust formations or adhesions in the rotary furnace are brought about by a fine dust mixture of aluminum fluoride enriched with SiO$_2$ in the particle range of $\leq 60\ \mu$.

The surprising recognition from the analytical investigations was at the same time the solution of the second part of the objective: aluminum fluoride, AlF$_3$, with an AlF$_3$ content $\geq 96\%$ by weight with a low SiO$_2$ content, preferably of $\leq 0.1\%$ by weight, can be produced when, analogously as for solution of the first part of the objective, one removes the fine portion of the aluminum fluoride hydrate dried or pre-calcined in the 1st step, before the total dehydration which follows as the 2nd step. As fine dust is here understood dust with particles up to $60\mu$. The main portion, however, lies in the range $\leq 45\mu$, in particular in the range $\leq 20\mu$. If a pre-calcining occurs in the 1st step along with the pre-drying, then this can be carried out according to the invention in the range of hydrates AlF$_3$.3H$_2$O and AlF$_3$.0.3H$_3$O.

By removal of this fine dust one can thus produce an AlF$_3$ product which is purer as regards SiO$_2$. The concentration of the SiO$_2$ is to be attributed to the crystallization step of the aluminum fluoride hydrate.

It has been surprisingly found that, by partial air screening, a separation of the fine AlF$_3$ dust rich in SiO$_2$ is possible. The fine dust carried off with the air can thereafter be extracted, for example by means of a fabric filter.

The method according to the invention is suitably carried out in such a way that on the one hand in a 1st step aluminum fluoride hydrate is pre-dried or pre-calcined by means of a pneumatic conveyor drier or disc drier, whereupon, with insertion of a pneumatic conveyor drier in the 1st step, for separation of the fine dust portion of the pre-dried or pre-calcined intermediate product in the 2nd step within the scope of a two-step separation of the total product by means of a cyclone and fabric filter, the cyclone is so adjusted that the material extracted in it is free from fine portions in the particle range $\leq 45\mu$, while the fine dust product is totally extracted in the subsequent fabric filter.

With insertion of a disc drier, the flow of air between the discs is advantageously to be so controlled that upon falling of the product from one disc to the next a screening occurs such that the fine portion of the product in the particle range $\leq 45\mu$ is sucked out of the drier together with the flushing gases, and is thereafter totally separated by means of a fabric filter.

If the partially dehydrated aluminum fluoride hydrate, suitably extracted by cyclone or delivered from the disc drier, free of dust and thus pure as regards SiO$_2$ content, is subjected in the 2nd method step to a treatment which efficiently suppresses the hydrolysis and causes the complete dehydration, then one obtains a practically dehydrated aluminum fluoride—a content of up to about 0.2% by weight of remaining water is tolerated and usually not even mentioned—with an impurity content of a maximum $\leq 4\%$, usually $\leq 3\%$, where only about 2–3% thereof is SiO$_2$, the rest is Al$_2$O$_3$.

The feared adhesions which restrict transmission of heat during the total dehydration of aluminum fluoride hydrate, on and between the walls of the dehydrating apparatus in question, which render a continuous calcining impossible, are prevented.

The invention will be explained with reference to examples.

EXAMPLE 1

Aluminum fluoride trihydrate of the following specification

| Surface moisture: (absorbed water) | | 5.9% by weight |
|---|---|---|
| Sieve analysis | $>100\mu$ | 36.7% |
| | $100-60\mu$ | 51.8% |
| | $60-40\mu$ | 8.1% |
| | $<40\mu$ | 3.4% | was dried in a disc drier according to U.S. Pat. No. 3,991,171 and pre-calcined to aluminum fluoride semihydrate AlF$_3$.0.5H$_2$O. The temperature of the pre-calcined product at the discharge of the disc drier amounted to 135° C. The air flow in the disc drier was so controlled that, upon falling of the product from one disc to the next a screening took place, in such a way that particles $\leq 40\mu$ were carried off with the exhaust gases in the drier. The main quantity of the particles as fine as dust lay around $8\mu$. This dust portion was totally separated in a fabric filter, while the exhaust gases from the process were led into the atmosphere after passage of a wet cleaning step.

The dust-free aluminum fluoride semihydrate obtained in the disc drier was thereafter heated during 10 minutes to the calcining temperature of 550° C., in a rotary furnace indirectly heated with combustion gases, to which 128 kg of product were supplied per hour. The total residence time of the aluminum fluoride in the furnace amounted to 38.5 minutes. The water content of the flushing air carried in countercurrent through the calcining drum amounted in the exhaust gas to 45.5% by weight. The exhaust gas temperature lay around 175° C. The calcining drum was free from adhesions The calcined aluminum fluoride had a purity of 98.2% by weight and contained 0.03% by weight SiO$_2$. The loss on ignition amounted to 0.35% by weight. The remainder of 1.39% by weight were Al$_2$O$_3$ and other impurities in traces such as P$_2$O$_5$, Fe$_2$O$_5$, SO$_4{}^{2-}$.

EXAMPLE 2

256 kg of aluminum fluoride trihydrate of the same specification as in Example 1 were introduced by a screw into the vertical delivery pipe of a pneumatic conveyor drier, there mixed with combustion gases of a temperature of 380° C., and delivered pneumatically 8 meters upwards. The temperature of the delivered product before the 2-step separation by cyclones and fabric filters amounted to 120° C. In the cyclone step the coarse portion of the dried and calcined aluminum fluoride trihydrate was separated.

The product obtained had the following particle distribution (% by weight):

| | |
|---|---|
| >100μ | 35.5% |
| 60–100μ | 56.4% |
| 40–60μ | 8.0% |
| <40μ | 0.1% | i.e. the product was practically free of dust. In a fabric filter step the remaining fine dust was totally separated from the exhaust gas, and the exhaust gases were further treated as in Example 1. The main part of the extracted fine dust portions lay in the range of 1 to 10μ.

The pre-dried aluminum fluoride hydrate, free of fine dust, was heated during 12 minutes to the calcining temperature of 550° C., for further dehydration, in a rotary furnace indirectly heated with combustion gases, to which 107 kg of product was supplied per hour. The total residence time of the aluminum fluoride in the calcining drum amounted to 43 minutes. The steam in the flushing air delivered in countercurrent through the calcining drum amounted in the exhaust gas at the furnace outlet to 55.8% by weight, the exhaust gas temperature lay around 185° C. The calcining drum, as in Example 1, was free from any aluminum fluoride crusts.

Also in this way of carrying out the 2-step dehydrating method, no significant hydrolysis to $Al_2O_3$ could be detected.

The product analysis gave an AlF content of 97.9% by weight, a $SiO_2$ content of 0.07% by weight and a loss on ignition of 0.34% by weight. From the difference from 100 there results a content of $Al_2O_3$ and other impurities of 1.69% by weight.

The $AlF_3$ products obtained from the two Examples were free of dust, and could be used without any difficulty for aluminum fusion electrolysis.

The experimental conditions described above were held constant during 100 hours. After subsequent inspection no adhesions on the furnace wall could be detected.

In order to check the adhesion process, thereafter for 8 hours a quantity of fine dust extracted in the fabric filter, corresponding to the composition of the product not separated from the fine dust, was again mixed with the supply product. With this method of operation, crusts built up again after 8 hours on the calcining wall which already hindered the transmission of heat and made impossible a continuous further calcining.

For the case in which a low $SiO_2$ content in the fully calcined aluminum fluoride, $AlF_3$, is not in the forefront of interest, but the prevention of the adhesions which restrict transmission of heat, then to increase the economy of the method according to the invention, as regards the separated fine dust, which according to the circumstances in the crystallization portion of the manufacture of aluminum fluoride hydrate can amount to 1 to a maximum of 10% by weight of the production, one seeks after a suitably preparatory process, to admit this dried or calcined aluminum fluoride hydrate portion also to the calcining, and thus to raise the total production yield.

It is apparent that according to the present perceptions a coarsening of the fine dust is necessary.

Thorough experiments with the usual, available methods for particle coarsening by means of roller presses, shell presses, tableting apparatus etc. did not lead to success. The fine dust could indeed be worked up into coarser particles, but these disintegrated during the following calcining process, and at once produced again the adhesions and crust formations.

Surprisingly it was found that, with intensive mixing of the extracted fine dust with finely divided metastable aluminum fluoride solution from the aluminum fluoride hydrate manufacturing process as binde, with occurrence of an exothermic crystallization reaction, a particle size coarsening of the fine dust succeeded. Suitably the $AlF_3$ concentration of the metastable $AlF_3$ solution is held at 5 to a maximum of 30, preferably at 10 to 15% by weight.

Following this method, a product is obtained in practice which corresponds as regards its physical properties to the preferred hydrate coarse particle of about 80–200μ in the crystallization part of the aluminum fluoride hydrate manufacturing method. Chemically it differs from this by the increased content of $SiO_2$, which however creates no further trouble during the further treatment.

As a variation of method of the method according to the invention for the manufacture of dust-free calcined aluminum fluoride, the granular product obtained in this way can be mixed with the supply product of the calcining step, and contributes along with the increase of the output to the total coarsening of the calcined $AlF_3$ product grain size spectrum.

This variation of method is recommended of course only when it is not important to have an end product which is especially low in $SiO_2$, because by the further use of the fine dust, the $SiO_2$ which produces the adhesions and crusts is indeed also worked in.

The method for coarsening and further treatment of the fine dust will be explained with reference to the following examples:

EXAMPLE 3

The fine dust separated in the fabric filter of Example 1 had added to it a metastable solution with 120 g $AlF_3$/l in an intensive mixer with rotating components during 15 minutes, with 425 ml/kg dust. During this, the temperature of the mixed product rose from 20° to about 65° C. The product obtained with the following grain size distribution (% by weight)

| | |
|---|---|
| >2 mm | 2% |
| 1–2 mm | 8% |
| 0.5–1 mm | 17% |
| 0.2–0.5 mm | 48% |
| 0.1–0.2 mm | 17% |
| <0.1 mm | 8% | was calcined to dehydrated aluminum fluoride under the method conditions described in Example 1 in an indirectly heated rotary furnace. The analysis of the calcined product gave an $AlF_3$ content of 98.1% by weight, the $SiO_2$ content amounted to 0.16% by weight, and thus again lay within the acceptable range for aluminum fusion electrolysis.

EXAMPLE 4

The separated fine dust from Example 2 was, as described in Example 3, coarsened and mixed with the supply product for calcining step in the proportion 97 parts supply product: 3 parts coarse dust, and calcined analogously as in Example 3. The grain size distribution of the total product was (% by weight):

| | |
|---|---|
| >100μ | 38.2% |
| 60-100μ | 58.2% |
| 40-60μ | 3.6% |

Thus the method according to the invention, coupled with the treatment according to the invention of the fine dust, delivered a calcined aluminum fluoride, the total content of which lay in the grain size range above 40μ.

By this way of proceeding there is provided not only the possibility to bring back into the production process on economic considerations the necessarily separated fine dust, but a product is obtained which, compared with the state of the art, is improved and practically dust free, which has all along been desired by the end user—especially by the aluminum works—on the grounds of dust loss by eddying and the working hygiene on loading of the electrolysis baths with aluminum fluoride.

By the method according to the invention it is even possible by variation of the screening parameters to suit the grain size distribution of the aluminum fluoride product to the special requirements of the end user.

What is claimed is:

1. A method of manufacturing dust-free aluminum fluoride from aluminum fluoride hydrates comprising:
   drying the aluminum fluoride hydrate so as to partially dehydrate said aluminum fluoride hydrate;
   separating out the fines of the partially dehydrated aluminum fluoride hydrate from the partially dehydrated aluminum fluoride hydrate;
   drying and calcining said partially dehydrated aluminum fluoride hydrate by heating said partially dehydrated aluminum fluoride hydrate to a temperature of between 500° to 600° C. within 45 minutes so as to completely dehydrate and calcine same; and
   mixing the fines of the partially dehydrated aluminum fluoride hydrate with a metastable aluminum fluoride solution so as to coarsen said fines.

2. A method according to claim 1 wherein the fines of the partially dehydrated aluminum fluoride hydrate have a particle size of ≦60 microns.

3. A method according to claim 1 wherein the fines of the partially dehydrated aluminum fluoride hydrate have a particle size of ≦40 microns.

4. A method according to claim 1 wherein the coarsened fines of the partially dehydrated aluminum fluoride hydrate is dried and calcined so as to completely dehydrate and calcine same.

5. A method according to claim 1 including the step of providing a disc drier for partially dehydrating said aluminum fluoride hydrate.

6. A method according to claim 1 including the step of providing an indirectly heated rotary furnace for completely dehydrating and calcining said partially dehydrated aluminum fluoride hydrate.

7. A method according to claim 1 including the step of providing a pneumatic conveyor drier for partially dehydrating said aluminum fluoride hydrate.

8. A method according to claim 1 including the steps of providing an air screening for separating out the fines of the partially dehydrated aluminum fluoride hydrate.

9. A method according to claim 1 including the step of providing cyclones for separating out the fines of the partially dehydrated aluminum fluoride hydrate.

10. A method according to claim 1 further including the step of extracting said fines of the partially dehydrated aluminum fluoride hydrate by means of a fabric filter.

11. A method according to claim 1 wherein the aluminum fluoride hydrate is in the range of hydrates $AlF_3.3H_2O$ and $AlF_3.0.3H_2O$.

* * * * *